United States Patent
Kojima et al.

(10) Patent No.: US 12,152,140 B2
(45) Date of Patent: Nov. 26, 2024

(54) CONDUCTIVE RESIN COMPOSITION, RESIN MOLDED BODY, AND ARTICLE

(71) Applicant: CANON KABUSHIKI KAISHA, Tokyo (JP)

(72) Inventors: Takahiro Kojima, Kanagawa (JP); Akira Yane, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 146 days.

(21) Appl. No.: 17/177,728

(22) Filed: Feb. 17, 2021

(65) Prior Publication Data

US 2021/0261767 A1  Aug. 26, 2021

(30) Foreign Application Priority Data

Feb. 21, 2020 (JP) .................. 2020-028011
Dec. 22, 2020 (JP) .................. 2020-212460

(51) Int. Cl.
  *C08L 59/02* (2006.01)
  *C08K 3/04* (2006.01)
  *C08K 5/353* (2006.01)

(52) U.S. Cl.
  CPC ............ *C08L 59/02* (2013.01); *C08K 3/04* (2013.01); *C08K 5/353* (2013.01); *C08K 2201/001* (2013.01)

(58) Field of Classification Search
  CPC .......... C08L 59/02; C08L 59/00; C08L 25/06; C08K 3/04; C08K 5/353; C08K 2201/001
  See application file for complete search history.

(56) References Cited

FOREIGN PATENT DOCUMENTS

| CN | 1875066 | A | 12/2006 |
|---|---|---|---|
| CN | 104812835 | A | 7/2015 |
| CN | 107109029 | A | 8/2017 |
| JP | S61151267 | A | 7/1986 |
| JP | S62267351 | A | 11/1987 |
| JP | 63-286470 | * | 11/1988 |
| JP | H07268179 | A | 10/1995 |
| JP | H10-228817 | * | 8/1998 |
| JP | 2001-142176 | A | 5/2001 |
| JP | 2003096265 | A | 4/2003 |
| JP | 2009-269996 | * | 11/2009 |
| JP | 2009269996 | A | 11/2009 |
| JP | 2017061708 | A | 3/2017 |
| WO | 2016104255 | A1 | 6/2016 |

OTHER PUBLICATIONS

Machine translation of JP 2009-269996 (Year: 2009).*
Machine translation of JP 63-286470 (Year: 1998).*
Human translation of portions of JP 63-286470 (Year: 1998).*
Machine translation of JP 10-22817 (Year: 1998).*
Luo Shaohua, "Functional Material", 1st Edition; Northeastern University Press, pp. 416-417, 2014.
Xu Hewei, "Handbook of Electric Vehicle", vol. 4 Power battery; pp. 194-195, 2019.

* cited by examiner

*Primary Examiner* — Doris L Lee
(74) *Attorney, Agent, or Firm* — Canon U.S.A., Inc. I.P. Division

(57) ABSTRACT

A conductive resin composition which has high conductivity and a low water absorption rate, in which thermal decomposition of a polyacetal resin is reduced, and which causes no problems in practical use in injection molding applications, and a resin molded body and an article each including the conductive resin composition. The conductive resin composition includes: a polyacetal serving as a main component; carbon black; graphite; and an oxazoline group-containing compound and a reaction product thereof.

20 Claims, No Drawings

CONDUCTIVE RESIN COMPOSITION, RESIN MOLDED BODY, AND ARTICLE

BACKGROUND OF THE INVENTION

Field of the Invention

The present disclosure relates to a conductive resin composition including a polyacetal as a main component, and a molded body and an article each including the conductive resin composition.

Description of the Related Art

A polyacetal (POM resin) is a resin having balanced mechanical properties and excellent slidability. In particular, the resin is excellent in slidability, and hence has been widely used in, for example, various precision mechanism parts typified by a gear and OA equipment. In particular, in recent years, the integration of members has been required in various applications, and hence a POM resin composition having added thereto a conductive filler for imparting conductivity as a characteristic except the slidability has been applied to a member having performance by which static electricity generated at the time of its sliding is removed and a function as a conductive wiring.

The POM resin composition having added thereto the conductive filler has an increased melt viscosity owing to the addition of the filler, and hence is liable to cause heat generation in the process of plasticization. In addition, when a filler surface or the like has an organic functional group having active hydrogen, in particular, an acidic proton, which accelerates a decomposition reaction of the POM resin, formaldehyde is liable to be produced as a thermal decomposition product.

In Japanese Patent Application Laid-Open No. 2009-269996, there is a disclosure of a POM resin composition having thermal stability and high conductivity imparted thereto by adding conductive carbon black and graphite, and further blending an olefin-based resin, an ester formed from a fatty acid and an aliphatic alcohol, and an epoxy compound. It is conceived that, in such POM resin composition, the ester formed from a fatty acid and an aliphatic alcohol acts as a lubricant to suppress heat generation in the process of kneading, plasticization molding, or the like, and the epoxy compound reacts with the organic functional group having active hydrogen to inhibit the decomposition reaction.

SUMMARY OF THE INVENTION

According to a first aspect of the present disclosure, there is provided a conductive resin composition including: a polyacetal serving as a main component: carbon black; and graphite, the conductive resin composition further including an oxazoline group-containing compound and a reaction product thereof.

According to a second aspect of the present disclosure, there is provided a resin molded body including the conductive resin composition of the present disclosure.

Further features of the present disclosure will become apparent from the following description of exemplary embodiments.

DESCRIPTION OF THE EMBODIMENTS

An epoxy compound undergoes the ring-opening of its epoxy group through a reaction with a functional group having active hydrogen, to thereby give a condensate having a hydrophilic hydroxy group on carbon at a position adjacent to the condensed functional group. Accordingly, the water absorption rate of the reaction product generally tends to be as high as around 2%, though varying depending on the structure of the epoxy compound, the equivalent of its epoxy functional group, and the structure of the condensate partner. Accordingly, in the case of the POM resin composition disclosed in Japanese Patent Application Laid-Open No. 2009-269996, when the epoxy compound is added to a POM resin, which generally has a water absorption rate of from 0.2% to 0.3%, and the resultant is subjected to extrusion and kneading involving a reaction of the epoxy compound, the water absorption rate is expected to be increased as compared to that of the POM resin alone. A reversible phenomenon of drying and water absorption affects the dimensional stability of a resin molded body at the time of a fluctuation in ambient humidity, and hence the increase in water absorption rate of the POM resin composition is not preferred.

Modes for carrying out the present disclosure are described in detail below.

<Configuration of Conductive Resin Composition>

A conductive resin composition of the present disclosure is a resin composition including a polyacetal (POM resin) as a main component, and carbon black and graphite as conductive fillers, the resin composition further including an oxazoline group-containing compound and a reaction product thereof. In this configuration, by virtue of combining the carbon black and the graphite, high conductivity and high slidability are obtained.

Oxazoline is a five-membered ring heterocyclic compound having the chemical formula $C_3H_5NO$. It is known that the oxazoline group-containing compound, which is a compound having an oxazoline group in the molecular structure thereof, reacts with an organic functional group, such as a carboxylic acid or phenol, to give a condensation compound between an N-acylethanolamine obtained by the ring-opening of the oxazoline group and the organic functional group. As an example, a reaction between an oxazoline compound having an aromatic ring and a phenol is shown below.

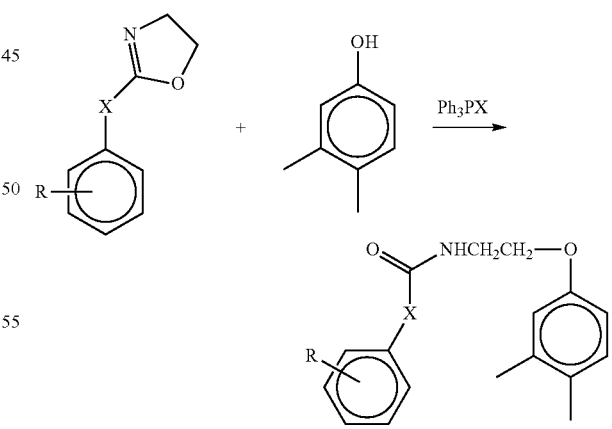

In the formula, R represents hydrogen or an oxazoline group, X represents a single bond or a hydrocarbon chain having 5 or less carbon atoms, and a terminal thereof may be copolymerized with another copolymerization component. In addition, X in $Ph_3PX$ represents an unshared electron pair (no element or functional group), an oxygen atom, or a hydroxyl group.

An organic functional group, such as a carboxylic acid or phenol, derived from a production process remains on the surface of the carbon black. In addition, such organic functional group has acidic active hydrogen (proton), and hence is liable to accelerate the decomposition reaction of the POM resin to produce formaldehyde as a thermal decomposition product. The oxazoline group-containing compound reacts with the organic functional group having a proton to give a condensation compound. Accordingly, when the oxazoline group-containing compound is incorporated into the resin composition, the organic functional group on the surface of the carbon black is consumed. As a result, the decomposition reaction of the POM resin, which is accelerated by the organic functional group, can be inhibited. In addition, unlike a product obtained through a reaction between the organic functional group and an epoxy compound, the condensation compound that is the reaction product of the oxazoline group-containing compound and the organic functional group is free of a hydroxy group, and hence can reduce the water absorption rate.

The structure of the oxazoline group-containing compound to be used in the present disclosure is not particularly limited, but the oxazoline group-containing compound preferably has an aromatic ring in the molecular structure thereof. When the oxazoline group-containing compound has an aromatic ring, it is expected that the oxazoline group-containing compound is adsorbed on the carbon black or the graphite through an electronic interaction with the carbon black or the graphite having conductive carbon atoms in $sp^2$ hybrid orbitals. As a result, the organic functional group having a proton on the surface of the carbon black and the oxazoline group preferentially react with each other, and hence the decomposition reaction of the POM resin can be more effectively inhibited.

An example of the oxazoline group-containing compound having an aromatic ring is an oxazoline derivative represented by the following formula (1).

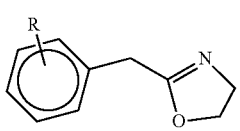

(1)

In the formula, R represents hydrogen or an oxazoline group, X represents a single bond or a hydrocarbon chain having 5 or less carbon atoms, and a terminal thereof may be copolymerized with another copolymerization component.

A commercially available oxazoline compound may be used as the oxazoline derivative. A specific example thereof is "CP Resin A 1,3-BPO (product name)" manufactured by Mikuni Pharmaceutical Industrial Co., Ltd., which is represented by the following formula (2). Another example is "EPOCROS (trademark) RPS-1005S (model number)" manufactured by Nippon Shokubai Co., Ltd., which is an oxazoline-modified polystyrene containing as a main component a structure represented by the following formula (3). A plurality of kinds of those compounds may be used in combination. In addition, there may be used, in combination therewith, another compound that reacts with active hydrogen, specifically a nitrogen-containing compound, such as an isocyanate serving as a raw material for urethane, urea, or a urea resin.

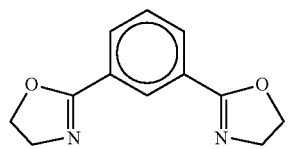

(2)

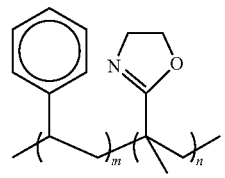

(3)

In the formula (3), "m" and "n" each represent an integer.

In addition, an aromatic phosphorus compound is preferably added to the conductive resin composition of the present disclosure in order to accelerate the reaction between the oxazoline group and the organic functional group. Examples of the aromatic phosphorus compound include triphenylphosphine, triphenyl phosphite, triphenyl phosphate, and a product obtained by substituting hydrogen on an aromatic ring of any of those compounds with an organic functional group. In particular, triphenylphosphine may be suitably used. In addition, those compounds may be added alone or in combination thereof. In general, in the reaction between the oxazoline group and the organic functional group, a standard use amount of the aromatic phosphorus compound is a catalytic amount (about 1%) with respect to the oxazoline group-containing compound. However, in the case where the reaction is performed not in a solution system, but in a viscous fluid having a high viscosity, such as a molten resin, in particular, in the case where the reaction is performed by passing the conductive resin composition through a continuous reactor, such as a kneading extruder, reaction rate and time are limited, and hence it is desired to use the aromatic phosphorus compound in an excess amount. Specifically, from the viewpoint of completing the reaction, the use amount of the aromatic phosphorus compound preferably falls within the range of 1 mass % or more and 200 mass % or less with respect to the oxazoline group-containing compound. In order to prevent physical properties of the composition from being impaired, the use amount more preferably falls within the range of 10 mass % or more and 100 mass % or less.

In addition, the total stoichiometric amount (in terms of oxazoline group units) of the oxazoline group-containing compound and the reaction product thereof in the conductive resin composition of the present disclosure is preferably 0.02 mmol or more and 2 mmol or less with respect to 1 g of the carbon black in the resin composition. The stoichiometric amount is more preferably 0.02 mmol or more and 0.2 mmol or less. When the amount is less than 0.02 mmol, the amount of oxazoline groups is not sufficient with respect to organic functional groups present on the surface of the carbon black. Accordingly, organic functional groups remain, and hence the inhibitory effect on the decomposition reaction of the POM resin is weakened. In addition, when the stoichiometric amount is more than 2 mmol, an unreacted oxazoline group is liable to remain in the resin composition, and hence the long-term stability of each of the conductive resin composition and a molded body thereof is liable to be impaired.

Next, the constituent components of the conductive resin composition of the present disclosure are described.

<POM Resin>

The conductive resin composition of the present disclosure is a resin composition including a POM resin as a main component. As used herein, the term "main component" means that the ratio of the POM resin in the conductive resin composition is 50 mass % or more. The ratio of the POM resin is more preferably 70 mass % or more from the viewpoint of securing the original slidability and strength of the polyacetal.

Typical examples of the POM resin to be used in the present disclosure may include: a polyacetal homopolymer substantially formed only of an oxymethylene unit, which is obtained by subjecting a formaldehyde monomer or a multimer thereof (e.g., trioxane) to homopolymerization; and a polyacetal copolymer, which is obtained by subjecting a formaldehyde monomer or a multimer thereof (e.g., trioxane) and a glycol, a cyclic ether, or a cyclic formal, such as ethylene oxide, propylene oxide, epichlorohydrin, or 1,3-dioxolane, to copolymerization.

The polyacetal copolymer may be preferably used in terms of chemical stability. In addition, a polyacetal copolymer having a crosslinked structure or a block structure may be used in accordance with the kind of the copolymer, and the structural feature of the polyacetal copolymer is not particularly limited.

Although the terminal structure of the polymer is also not particularly limited, when a hydroxy group of the oxymethylene unit or an aldehyde is present in a terminal portion thereof, it is difficult to put the polymer as it is into practical use because the terminal portion serves as the starting point of the thermal decomposition of the polymer. There is preferably used a POM resin obtained by subjecting a terminal of the oxymethylene unit to a chemical sealing treatment, or subjecting the unstable terminal portion to a decomposition treatment with any one of, for example, amines and an ammonium compound, to cause a copolymer component except the oxymethylene unit to serve as a terminal.

A commercial POM resin having added thereto various additives in accordance with its applications may be used as the POM resin to be used in the present disclosure. Specific examples thereof are as follows.

"DURACON (trademark)" series manufactured by Polyplastics Co., Ltd.

"TENAC (trademark)" series and "TENAC (trademark)-C" series each manufactured by Asahi Kasei Corporation "Iupital (trademark)" series manufactured by Mitsubishi Engineering-Plastics Corporation In addition, those POM resins may be used as a mixture thereof.

The melt flow rate (MFR, measured under the conditions of JIS-K7210) of the POM resin to be used in the present disclosure is from 0.5 g/10 min to 100 g/10 min, preferably from 1 g/10 min to 50 g/10 min at 190° C.

<Carbon Black>

The carbon black to be used in the present disclosure is preferably conductive carbon black having a developed chain structure. Carbon black having an average primary particle diameter as an aggregate (aggregate diameter) in the range of from 0.05 μm or more to 1 μm or less is preferably used. In addition, the addition amount of the carbon black is preferably 5 mass % or more and 25 mass % or less in the conductive resin composition. Such addition amount is preferred because of the following reasons: when the addition amount of the carbon black is 5 mass % or more, satisfactory conductivity is obtained; and when the addition amount is 25 mass % or less, heat generation at the time of molding is little, and hence the thermal decomposition of the POM resin hardly occurs. In addition, the addition amount is more preferably 15 mass % or less, which allows the resin composition to have satisfactory fluidity at the time of its molding. The addition amount is particularly preferably 7 mass % or more and 13 mass % or less in order to achieve a good balance between the thermal decomposition of the POM resin and the conductivity.

In addition, the dibutyl phthalate oil absorption (DBP oil absorption, ASTM D2415-65T) of the carbon black is preferably 250 ml/100 g or more for obtaining a resin composition having sufficient conductivity within the above-mentioned range of the addition amount.

Specific examples of the carbon black to be used in the present disclosure are as follows.

"DENKA BLACK (trademark)" (DBP oil absorption of a particulate product: 160 ml/100 g) manufactured by Denki Kagaku Kogyo Kabushiki Kaisha "SEAST (product name)" series (DBP oil absorption: 40 ml to 160 ml/100 g) and "TOKABLACK (product name)" series (DBP oil absorption: 50 ml to 170 ml/100 g) each manufactured by Tokai Carbon Co., Ltd.

"Mitsubishi Carbon Black (product name)" series (DBP oil absorption: 40 ml to 180 ml/100 g) manufactured by Mitsubishi Chemical Corporation The products each having a DBP oil absorption of more than 250 ml/100 g are as follows.

"KETJENBLACK (product name)" series (DBP oil absorption: 350 ml to 500 ml/100 g) and "LIONITE (product name)" series (DBP oil absorption: 250 ml to 400 ml/100 g) each manufactured by Lion Specialty Chemicals Co., Ltd.

"PRINTEX (product name)" series (50 ml to 420 ml/100 g) manufactured by Orion Engineered Carbons The carbon blacks may be used in combination thereof.

<Graphite>

The graphite to be used in the present disclosure may be appropriately selected from an artificial product and a natural product in accordance with purposes. The shape of the graphite is not particularly limited, and any one of, for example, a flaky shape, a lump shape, a spherical shape, and an earthy shape is permitted, but flaky graphite is preferred from the viewpoint of the expression of more satisfactory conductivity.

The average particle diameter of graphite powder to be used in the present disclosure preferably falls within the range of from 0.5 μm to 100 μm, and more preferably falls within the range of from 20 μm to 80 μm. The average particle diameter is preferably 20 μm or more from the viewpoints of high conductivity and dimensional stability at the time of a temperature change, and is preferably 100 μm or less from the viewpoints of handleability and the surface property of a molded article.

Specific examples of the flaky graphite include: "CP (product name)" series and "F #(product name)" series each manufactured by Nippon Graphite Industries, Co., Ltd.; and "CNP (product name)" series and "Z (product name)" series each manufactured by Ito Graphite Co., Ltd. In addition, two or more kinds of graphite may be used in combination. In addition, the addition amount of the graphite preferably falls within the range of from 2 mass % to 8 mass % in the conductive resin composition.

<Other Additives>

The conductive resin composition of the present disclosure may contain other various additives blended therein as required. Examples of various additives for improving the functionality include: flame retardants: waxes; lubricants and release agents, such as metallic salts of various fatty acids, fatty acid amides, fatty acid esters, or fatty acids: sliding performance improving agents, such as various antistatic agents, fatty acid esters, polyolefin olefin copolymer elastomers, or polysiloxane: decomposition inhibitors of a POM resin, such as a polyamide resin, a polymer of acrylamide, an amide compound, an amino-substituted triazine compound and derivatives thereof, urea and derivatives thereof, a hydrazine derivative, an imidazole compound, an imide compound, and an epoxy compound: formic acid scavengers, such as a hydroxide or a carbonate of melamine or an alkali metal: impact resistance improving agents, such as a polyurethane elastomer, a polyester elastomer, and a polystyrene elastomer; and flame retardants, such as organic phosphorus compounds. In addition, examples of the various additives for improving long-term stability include: UV absorbing agents, such as a benzotriazole-based compound, a benzophenone-based compound, and a phenyl salicylate compound: hindered amine-based light stabilizers, and hindered phenol-based antioxidants.

Of those, a polyolefin, an olefin copolymer elastomer, or a fatty acid ester is preferably used. Low-molecular-weight polyethylene is preferably used as the polyolefin, and a styrene/butadiene block copolymer is preferably used as the olefin copolymer elastomer. It is more preferred that the tensile yield stress of such additive be 10 MPa or more. When such additive is used, an improvement in abrasion resistance can be expected.

The fatty acid esters may each be suitably used because the esters are effective in improving slidability and alleviating a kneading torque at the time of the production of the resin composition. Specifically, an ester of a monovalent fatty acid and a monovalent aliphatic alcohol is preferred. A monovalent fatty acid that is naturally derived and easily available is, for example, myristic acid, stearic acid, montanic acid, oleic acid, linoleic acid, or linolenic acid, and an ester obtained from any such acid and an aliphatic alcohol may be suitably used. In particular, each of cetyl myristate and stearyl stearate is more preferred in terms of balance among characteristics such as slidability, a thermal deformation temperature, and a torque reduction amount at the time of kneading when used as an additive. The addition amount of any one of the fatty acid esters in the resin composition is preferably 10 mass % or less for the purpose of securing a balance among those characteristics.

In addition, an inorganic component, such as a metal oxide, a metal hydroxide, a carbonate, a sulfate, a silicate compound, a glass-based filler, a silicic acid compound, metal powder or a metal fiber, a carbon fiber, or a carbon nanotube, may be incorporated for the purpose of improving a function of the resin composition, such as a low thermal expansion rate or rigidity, to such an extent that the conductive performance of the present disclosure is not impaired.

Examples of the metal oxide include alumina, zinc oxide, titanium oxide, cerium oxide, calcium oxide, magnesium oxide, iron oxide, tin oxide, and antimony oxide. Examples of the metal hydroxide include calcium hydroxide, magnesium hydroxide, and aluminum hydroxide. Examples of the carbonate include basic magnesium carbonate, calcium carbonate, magnesium carbonate, zinc carbonate, barium carbonate, dawsonite, and hydrotalcite. Examples of the sulfate include calcium sulfate, barium sulfate, magnesium sulfate, and a gypsum fiber. Examples of the silicate compound include calcium silicate (e.g., wollastonite or xonotlite), talc, clay, mica, montmorillonite, bentonite, activated earth, sepiolite, imogolite, sericite, kaolin, vermiculite, and smectite. Examples of the glass-based filler include a glass fiber, a milled glass fiber, glass beads, glass flakes, and glass balloons. Examples of the silicic acid compound include silica (e.g., white carbon) and silica sand. As a main element for forming the metal powder or the metal fiber, there are given, for example, iron, aluminum, titanium, and copper, and a composite of any such element and another element may also be adopted.

The surfaces of those inorganic fillers may be treated with, for example, various surface treatment agents, such as a silane coupling agent, a titan coupling agent, an organic fatty acid, an alcohol, and an amine, a wax, and a silicone resin.

One or more kinds of the above-mentioned additives may be used in combination.

<With Regard to Constituent Components>

The constituent components of the conductive resin composition of the present disclosure may be known by combining a known separation technology and a known analysis technology. Although a method and a procedure for the separation and the analysis are not particularly limited, for example, the following may be performed: a solution is obtained by extracting organic components form a conductive resin composition, and its components are separated by, for example, various kinds of chromatography, and then component analysis is performed.

To extract the organic components from the conductive resin composition, the conductive resin composition only needs to be dissolved in a solvent in which the organic components are soluble. A time period required for the extraction can be shortened by finely crushing the conductive resin composition in advance or by stirring the solvent under heating. Although the solvent to be used may be arbitrarily selected in accordance with the properties of the organic components for forming the conductive resin composition, a solvent such as hexafluoropropanol is suitably used in the case of a resin composition including a POM resin like the present disclosure.

Herein, the content of an inorganic component in the conductive resin composition may be known by drying and weighing the residue remaining after the separation of the organic components. In addition, the following method is available as a method of knowing the content of the inorganic component in the conductive resin composition: the temperature of the conductive resin composition is increased to a temperature equal to or more than the decomposition temperature of the resin by thermogravimetric analysis (TGA) or the like, and an ash content is determined.

From the solution obtained by extracting the organic components from the conductive resin composition, the components may be separated by methods such as various kinds of chromatography. Low-molecular weight additives may be separated by gas chromatography (GC) or high performance liquid phase column chromatography (HPLC), and a high-molecular weight polymer may be separated by gel permeation chromatography (GPC) or the like. In particular, when the solution contains a crosslinked polymer or gel having a large molecular weight, or when a micelle is formed in the solution, centrifugal separation or separation with a semipermeable membrane may be selected. The separated organic components may be analyzed by a known analysis approach, such as nuclear magnetic resonance (NMR) spectrum measurement, infrared absorption (IR) spectrum measurement, Raman spectrum measurement, mass spectrum measurement, or elemental analysis.

The inorganic component, particularly the carbon black, the graphite, and the oxazoline group-containing compound chemically bonded to the organic functional groups on their surfaces may be recovered from a residue obtained by centrifugal separation after other organic components have been extracted through dissolution in a solvent capable of dissolving the other organic components. The residue may be separated into fragments of the respective components through appropriate chemical treatment, such as treatment with a strong acid or the like. After soluble components have been fractionated by centrifugal separation and then neutralized, followed by solvent removal and washing, their structures may be identified by a known analysis approach, such as gas chromatography (GC), high performance liquid phase column chromatography (HPLC), nuclear magnetic resonance (NMR) spectrum measurement, infrared absorption (IR) spectrum measurement, Raman spectrum measurement, mass spectrum measurement, or elemental analysis.

<Method of producing Conductive Resin Composition>

A method of producing the conductive resin composition of the present disclosure is not limited to a specific method, and a mixing method that has been generally adopted for a thermoplastic resin may be used. For example, the composition may be produced by mixing and kneading with a mixing machine, such as a tumbler, a V-type blender, a Banbury mixer, a kneading roll, a kneader, a single-screw extruder, or a multi-screw extruder having two or more screws. In particular, melting and kneading with a twin-screw extruder are excellent in productivity.

In the production of the conductive resin composition, a plurality of components out of the POM resin, the carbon black, the graphite, the oxazoline group-containing compound, and any other additive to be used as required may be preliminarily mixed or preliminarily kneaded in advance, or all the components may be simultaneously mixed or kneaded. In particular, in the production thereof with an extruder, the following kneading may be performed: an individual feeder is arranged for each component, and sequential addition is performed in an extrusion process.

When the other additives are preliminarily mixed with one or a plurality of the POM resin, the carbon black, the graphite, and the oxazoline group-containing compound, the mixture only needs to be treated by a dry method or a wet method. The dry method includes stirring the components with a stirring machine, such as a Henschel mixer or a ball mill. The wet method includes: adding the conductive resin to a solvent: stirring the mixture; and drying and removing the solvent after the mixing.

In the production of the resin composition by the melting and kneading of the components, a kneading temperature, a kneading time, and a feeding rate may be arbitrarily set in accordance with the kind and performance of a kneading apparatus, the properties of the components to be blended and the components of the other additives to be used as required. The kneading temperature is typically from 150° C. to 250° C., preferably from 160° C. to 230° C., more preferably from 170° C. to 210° C. When the kneading temperature is 150° C. or more, dispersibility becomes satisfactory, and when the kneading temperature is set to 250° C. or less, the production of formaldehyde and reductions in various physical properties due to thermal decomposition can be inhibited.

The conductive resin composition of the present disclosure may be easily molded into a resin molded body by a molding method that has been generally used, such as extrusion molding, injection molding, or compression molding. and may also be applied to blow molding, vacuum molding, two-color molding, insert molding, or the like. The resin molded body obtained by molding the conductive resin composition of the present disclosure is applied as a part for OA equipment or other electrical and electronic equipment, or a conductive functional part for electrical and electronic equipment. In addition, the resin molded body of the present disclosure may also be applied to, for example, a structural member for an automobile, an aircraft, or the like, a building member, or a food container. That is, the resin molded body may be applied to various production methods each including molding a resin composition with a mold to produce a resin molded body, and in particular, may be suitably used in a mechanism part for each of a copying machine main body and a toner cartridge container, which is required to have high conductivity and high slidability. Specifically, the composition is suitably used in, for example, an electrical contact member in electrical and electronic equipment, or a photosensitive drum flange, a process cartridge part, or a bearing member in an image-forming apparatus.

EXAMPLES

Materials used in Examples (including Comparative Examples) are as described below.
(A) POM Resin
  "DURACON (trademark) M270CA (product name)" manufactured by Polyplastics Co., Ltd.
(B) Conductive Carbon Black
  B-1: "LIONITE EC200L (product name)" manufactured by Lion Specialty Chemicals Co., Ltd. (DBP oil absorption: 260 ml/100 g)
  B-2: "LIONITE CB (product name)" manufactured by Lion Specialty Chemicals Co., Ltd. (DBP oil absorption: 378 ml/100 g)
  B-3: "PRINTEX XE2-B (product name)" manufactured by Orion Engineered Carbons (DBP oil absorption: 420 ml/100 g)
(C) Graphite
  C-1: "Z-25 (product name)" manufactured by Ito Graphite Co., Ltd. (flaky graphite, average particle diameter: 25 μm)
  C-2: "F #3 (product name)" manufactured by Nippon Graphite Industry Co., Ltd. (flaky graphite, average particle diameter: 60 μm)
(D) Oxazoline Group-Containing Compound
  D-1: "CP resin A 1,3-BPO (product name)" manufactured by Mikuni Pharmaceutical Industrial Co., Ltd. (difunctional oxazoline)
  D-2: "Epocros RPS-1005S (product name)" manufactured by Nippon Shokubai Co., Ltd. (oxazoline-modified polystyrene, oxazoline equivalent: 0.27 mmol/g)
(E) Other Additives
  E-1: "Spermaceti (product name)" manufactured by NOF Corporation (main component: cetyl myristate)
  E-2: "UBE polyethylene L719 (product name)" manufactured by Ube-Maruzen Polyethylene Co., Ltd. (low-density polyethylene, tensile yield stress: 13 MPa)
  E-3: "Suntec-LD L1850A (product name)" manufactured by Asahi Kasei Corporation (low-density polyethylene, tensile yield stress: 12 MPa)
  E-4: "ULT-ZEX 20100J (product name)" manufactured by Prime Polymer Co., Ltd. (low-density polyethylene, tensile yield stress: 9 MPa)
  E-5: "Modiper A1100 (product name)" manufactured by NOF Corporation (compatibilizing agent)
  E-6: "TR2827 (product name)" manufactured by JSR Corporation (styrene/butadiene block copolymer)

E-7: Triphenylphosphine manufactured by Kishida Chemical Co., Ltd.
E-8: Melamine manufactured by Kishida Chemical Co., Ltd. (aldehyde reactive compound)
E-9: 2-Imidazolidinone manufactured by Tokyo Chemical Industry Co., Ltd. (aldehyde reactive compound)
E-10: Phthalimide manufactured by Kishida Chemical Co., Ltd. (aldehyde reactive compound)
E-11: "Irganox 1010 (product name)" manufactured by BASF Japan (hindered phenol-based antioxidant)
E-12: "Irgafos 168 (product name)" manufactured by BASF Japan (phosphorus-based process stabilizer)
E-13: "ADK STAB ZS-27" manufactured by ADEKA Corporation (metal deactivator)
E-14: "1,2,3-benzotriazole" manufactured by Tokyo Chemical Industry Co., Ltd. (metal deactivator, aldehyde reactive compound)
E-15: Dicyandiamide manufactured by Kishida Chemical Co., Ltd. (epoxy curing agent)
E-16: "EPICLON-695 (product name)" manufactured by DIC Corporation (cresol novolac-type epoxy resin)
E-17: Coronate 4362 (product name) manufactured by Tosoh Corporation (isocyanate compound)

(Production of Conductive Resin Composition)

The POM resin (A) was dried at a temperature of 90° C. for 3 hours in advance. After that, the carbon black (B), the graphite (C), the oxazoline group-containing compound (D), and the other additives (E) were added so that the mass % of each component in a conductive resin composition to be finally obtained became a blending amount shown in Table 1. Thus, a blend of the raw materials was produced. The blend was melt-kneaded with a twin-screw extruder "PCM30 (product name)" manufactured by Ikegai Corp. under the condition of a cylinder temperature of 200° C. to produce a strand, which was cut with a pelletizer to provide a pellet of a conductive resin composition. The pellet thus obtained was subjected to the following evaluations. The results are shown in Table 1.

(Evaluation of Volume Resistivity)

The conductive resin composition was portioned out under the state of the strand before the cutting, and its diameter was measured with calipers. The resistance value of a range having a length of 5 cm was measured with "HANDY MILLI-OHM TESTER SK-3800 (product name)" manufactured by Kaise Corporation, and the volume resistivity of the conductive resin composition was calculated.

(Evaluation of Thermal Stability)

When the POM resin (A) in the conductive resin composition decomposes to produce a formaldehyde gas, the weight loss of the conductive resin composition can be observed. The composition was held in a stream of nitrogen at 225° C. for 2 hours with THERMOGRAVIMETRIC ANALYZER (TGA) "Q500" manufactured by TA Instruments, and its weight loss ratio was measured.

(Evaluation of Saturated Water Absorption Rate)

The obtained pellet of the conductive resin composition was subjected to injection molding with an injection molding machine "SE-180D (product name)" manufactured by Sumitomo Heavy Industries, Ltd. at a cylinder temperature of 200° C. and a mold temperature of 60° C. to produce a bar test specimen type B1 (measuring 80 mm long by 10 mm wide by 4 mm thick) specified in JIS K 7152-1.

With reference to Method A of JIS K 7209, the test specimen was immersed in water, and its saturated water absorption rate was determined from the weight increase of the test specimen. In Method A, the test specimen is generally immersed in water at 23+1° C. However, evaluation was performed under conditions equivalent to those of Method A except that only the immersion temperature was changed to 40+1° C. in order to perform an accelerated test.

(Evaluation of Abrasion Resistance)

The obtained pellet of the conductive resin composition was subjected to injection molding with an injection molding machine "SE-180D (product name)" manufactured by Sumitomo Heavy Industries, Ltd. at a cylinder temperature of 200° C. and a mold temperature of 30° C. to produce a molded body having a 07 mm circular hole. A shaft made of stainless steel having the same diameter was put through the circular hole, and the molded body was rotated at a rotation speed of 60 rpm for 24 hours. An abrasion amount in this case was evaluated. With reference to the abrasion amount of Example 1, a case in which the abrasion amount was comparable was marked with Symbol "A", a case in which the abrasion amount was exacerbated by 10% or more was marked with Symbol "B", and a case in which the abrasion amount was reduced by 10% or more was marked with Symbol "AA".

TABLE 1

| | | | Example 1 | Example 2 | Example 3 | Example 4 | Example 5 | Example 6 | Example 7 | Example 8 | Example 9 | Example 10 | Example 11 | Example 12 | Example 13 |
|---|---|---|---|---|---|---|---|---|---|---|---|---|---|---|---|
| Material | POM resin | A | 72.0 | 73.1 | 72.0 | 71.0 | 72.0 | 73.0 | 74.0 | 76.0 | 76.5 | 75.5 | 76.5 | 74.0 | 72.0 |
| | Carbon black | B-1 | 12.0 | 12.0 | 12.0 | 13.0 | 12.0 | 11.0 | 10.0 | | | | | 6.0 | 12.0 |
| | | B-2 | | | | | | | | 8.0 | 7.5 | 7.5 | | 4.0 | |
| | | B-3 | | | | | | | | | | | 7.5 | | |
| | Graphite | C-1 | 4.0 | 4.0 | 4.0 | | | | | | | | | | |
| | | C-2 | | | | 4.0 | 4.0 | 4.0 | 4.0 | 4.0 | 4.0 | 5.0 | 4.0 | 4.0 | 4.0 |
| | Oxazoline group-containing compound | D-1 | 1.5 | 0.75 | | | | | | | | | | | |
| | | D-2 | | | 1.5 | 1.5 | 1.5 | 1.5 | 1.5 | 1.5 | 1.5 | 1.5 | 1.5 | 1.5 | 1.5 |
| | Other additives | E-1 | 2.3 | 2.3 | 2.3 | 2.3 | 2.3 | 2.3 | 2.3 | 2.3 | 2.3 | 2.3 | 2.3 | 2.3 | 2.3 |
| | | E-2 | 7.5 | 7.5 | 7.5 | | | | | | | | | | |
| | | E-3 | | | | 7.5 | 7.5 | 7.5 | 7.5 | 7.5 | 7.5 | 7.5 | 7.5 | 7.5 | |
| | | E-4 | | | | | | | | | | | | | 7.5 |
| | | E-5 | | | | | | | | | | | | | |
| | | E-6 | | | | | | | | | | | | | |
| | | E-7 | 0.75 | 0.38 | 0.75 | 0.75 | 0.75 | 0.75 | 0.75 | 0.75 | 0.75 | 0.75 | 0.75 | 0.75 | 0.75 |
| | | E-8 | | | | | | | | | | | | | |
| | | E-9 | | | | | | | | | | | | | |
| | | E-10 | | | | | | | | | | | | | |

TABLE 1-continued

|  |  | Example 1 | Example 2 | Example 3 | Example 4 | Example 5 | Example 6 | Example 7 | Example 8 | Example 9 | Example 10 | Example 11 | Example 12 | Example 13 |
|---|---|---|---|---|---|---|---|---|---|---|---|---|---|---|
|  | E-11 |  |  |  |  |  |  |  |  |  |  |  |  |  |
|  | E-12 |  |  |  |  |  |  |  |  |  |  |  |  |  |
|  | E-13 |  |  |  |  |  |  |  |  |  |  |  |  |  |
|  | E-14 |  |  |  |  |  |  |  |  |  |  |  |  |  |
|  | E-15 |  |  |  |  |  |  |  |  |  |  |  |  |  |
|  | E-16 |  |  |  |  |  |  |  |  |  |  |  |  |  |
|  | E-17 |  |  |  |  |  |  |  |  |  |  |  |  |  |
| Functional group equivalent of reactive additive with respect to 1 g of B [mmol] |  | 1.16 | 0.58 | 0.03 | 0.03 | 0.03 | 0.03 | 0.04 | 0.05 | 0.05 | 0.05 | 0.05 | 0.04 | 0.03 |
| Evaluation result | Volume resistivity [Q · cm] | 6.2 | 4.4 | 3.0 | 2.1 | 2.4 | 4.0 | 4.3 | 5.6 | 6.2 | 9.7 | 6.0 | 3.8 | 4.9 |
|  | Thermal stability [%] | 1.0 | 1.1 | 1.4 | 1.6 | 1.3 | 1.1 | 1.0 | 1.7 | 1.6 | 1.7 | 1.6 | 1.9 | 1.4 |
|  | Saturated water absorption rate [%] | 0.31 | 0.30 | 0.28 | 0.28 | 0.28 | 0.28 | 0.27 | 0.30 | 0.29 | 0.31 | 0.27 | 0.28 | 0.28 |
|  | Abrasion resistance | — | A | AA | A | A | A | A | A | A | A | A | B | A |

TABLE 2

|  |  |  | Example 14 | Example 15 | Example 16 | Example 17 | Example 19 | Example 20 | Example 21 | Example 22 | Example 23 | Comparative Example 1 | Comparative Example 2 | Comparative Example 3 |
|---|---|---|---|---|---|---|---|---|---|---|---|---|---|---|
| Material | POM resin | A | 72.0 | 72.0 | 75.7 | 75.7 | 75.7 | 75.7 | 75.4 | 75.7 | 75.7 | 74.2 | 71.9 | 73.7 |
|  | Carbon black | B-1 | 12.0 | 12.0 |  |  |  |  |  |  |  | 12.0 | 12.0 | 12.0 |
|  |  | B-2 |  |  | 8.0 | 8.0 | 8.0 | 8.0 | 8.0 | 8.0 | 8.0 |  |  |  |
|  |  | B-3 |  |  |  |  |  |  |  |  |  |  |  |  |
|  | Graphite | C-1 |  |  |  |  |  |  |  |  |  | 4.0 | 4.0 | 4.0 |
|  |  | C-2 | 4.0 | 4.0 | 4.0 | 4.0 | 4.0 | 4.0 | 4.0 | 4.0 | 4.0 |  |  |  |
|  | Oxazoline group-containing compound | D-1 |  |  |  |  |  |  |  |  |  |  |  |  |
|  |  | D-2 | 1.5 | 1.5 | 1.5 | 1.5 | 1.5 | 1.5 | 1.5 | 1.5 | 1.5 |  |  |  |
|  | Other additives | E-1 | 2.3 | 2.3 | 2.3 | 2.3 | 2.3 | 2.3 | 2.3 | 2.3 | 2.3 | 2.3 | 2.3 | 2.3 |
|  |  | E-2 |  |  | 7.5 | 7.5 | 7.5 | 7.5 | 7.5 | 7.5 | 7.5 | 7.5 | 7.5 | 7.5 |
|  |  | E-3 | 6.5 |  |  |  |  |  |  |  |  |  |  |  |
|  |  | E-4 |  |  |  |  |  |  |  |  |  |  |  |  |
|  |  | E-5 | 1.0 |  |  |  |  |  |  |  |  |  |  |  |
|  |  | E-6 |  | 7.5 |  |  |  |  |  |  |  |  |  |  |
|  |  | E-7 | 0.75 | 0.75 | 0.75 | 0.75 | 0.75 | 0.75 | 0.75 | 0.75 | 0.75 |  | 0.75 |  |
|  |  | E-8 |  |  | 0.30 |  |  |  |  |  |  |  |  |  |
|  |  | E-9 |  |  |  | 0.30 |  |  |  |  |  |  |  |  |
|  |  | E-10 |  |  |  |  | 0.30 |  |  |  |  |  |  |  |
|  |  | E-11 |  |  |  |  |  | 0.30 | 0.30 |  |  |  |  |  |
|  |  | E-12 |  |  |  |  |  |  | 0.30 |  |  |  |  |  |
|  |  | E-13 |  |  |  |  |  |  |  | 0.30 |  |  |  |  |
|  |  | E-14 |  |  |  |  |  |  |  |  | 0.30 |  |  |  |
|  |  | E-15 |  |  |  |  |  |  |  |  |  |  | 0.075 |  |
|  |  | E-16 |  |  |  |  |  |  |  |  |  |  | 1.5 |  |
|  |  | E-17 |  |  |  |  |  |  |  |  |  |  |  | 1.5 |
| Functional group equivalent of reactive additive with respect to 1 g of B [mmol] |  |  | 0.03 | 0.03 | 0.05 | 0.05 | 0.05 | 0.05 | 0.05 | 0.05 | 0.05 | — | 0.58 | 0.16 |
| Evaluation result | Volume resistivity [Q · cm] |  | 3.1 | 4.5 | 4.4 | 4.6 | 4.5 | 4.4 | 4.5 | 4.6 | 4.4 | — | 6.4 | 11.0 |
|  | Thermal stability [%] |  | 1.3 | 1.4 | 1.2 | 1.3 | 1.2 | 1.3 | 1.2 | 1.3 | 1.2 | — | 1.2 | 3.7 |
|  | Saturated water absorption rate [%] |  | 0.29 | 0.30 | 0.29 | 0.28 | 0.28 | 0.28 | 0.28 | 0.29 | 0.29 | — | 0.34 | 0.38 |
|  | Abrasion resistance |  | AA | AA | AA | AA | AA | AA | AA | AA | AA | — | AA | B |

In Table 1, D-1, D-2, E-16, and E-17 are additives that react with functional groups present on carbon surfaces.

It was found from Table 1 and Table 2 that, when an oxazoline group-containing compound was added, a resin composition having high conductivity, having its thermal decomposition reduced, and having a low water absorption rate, and a molded body thereof were obtained as compared to the case of adding any other reactive additive. In Comparative Example 1, in which no reactive additive was added, the POM resin was severely decomposed during extrusion and kneading, and hence it was impossible to perform pellet production.

The present disclosure is not limited to the embodiments and Examples described above, and many modifications may be performed within the technical idea of the present disclosure. In addition, the effects described in the embodiments and Examples of the present disclosure are merely examples of the most suitable effect arising from the present disclosure, and the effects according to the present disclosure are not limited to those described in the embodiments and Examples.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-028011, filed Feb. 21, 2020, and Japanese Patent Application No. 2020-212460, filed Dec. 22, 2020 which are hereby incorporated by reference herein in their entirety.

What is claimed is:

1. A conductive resin composition comprising:
   a polyacetal;
   conductive carbon black which has an organic functional group having acid active hydrogen;
   graphite; and
   an oxazoline group-containing compound and a reaction product thereof,
   wherein a content of the polyacetal is 50 mass % or more,
   wherein the oxazoline group-containing compound is an oxazoline derivative represented by the following formula (2) or (3)

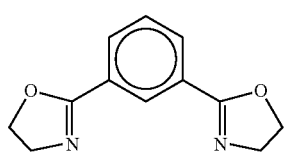
(2)

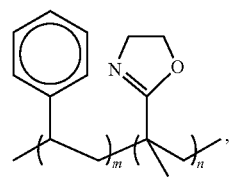
(3)

and
   wherein in the formula (3), m and n each represents an integer, and
   wherein a total stoichiometric amount of the oxazoline group-containing compound and the reaction product thereof is 0.02 mmol or more and 2 mmol or less with respect to 1 g of the carbon black.

2. The conductive resin composition according to claim 1, wherein the carbon black has a dibutyl phthalate oil absorption of 250 ml/100 g or more.

3. The conductive resin composition according to claim 1, wherein the content of the polyacetal is 70 mass % or more.

4. The conductive resin composition according to claim 1, wherein the content of the carbon black is 7 mass % or more and 13 mass % or less.

5. The conductive resin composition according to claim 1, wherein the content of the graphite is 2 mass % or more and 8 mass % or less.

6. The conductive resin composition according to claim 1, wherein the content of the oxazoline group-containing compound and the reaction product is 0.75 mass % or more and 1.5 mass % or less.

7. The conductive resin composition according to claim 1, wherein the organic functional group is carboxylic acid or phenol.

8. The conductive resin composition according to claim 1, further comprising an aromatic phosphorus compound.

9. The conductive resin composition according to claim 8, wherein the aromatic phosphorus compound is triphenylphosphine.

10. The conductive resin composition according to claim 1, further comprising a fatty acid ester.

11. The conductive resin composition according to claim 10, wherein the fatty acid ester is at least one member selected from the group consisting of cetyl myristate and stearyl stearate.

12. The conductive resin composition according to claim 10, wherein a content of the fatty acid ester is 10 mass % or less in the conductive resin composition.

13. The conductive resin composition according to claim 1, further comprising one of a polyolefin and an olefin copolymer elastomer.

14. The conductive resin composition according to claim 13, wherein the polyolefin is polyethylene having a tensile yield stress of 10 MPa or more.

15. The conductive resin composition according to claim 13, wherein a content of the polyolefin is 10 mass % or less in the conductive resin composition.

16. A resin molded body comprising a conductive resin composition,
   the conductive resin composition comprising:
   a polyacetal;
   conductive carbon black which has an organic functional group having acid active hydrogen;
   graphite; and
   an oxazoline group-containing compound and a reaction product thereof,
   wherein a content of the polyacetal is 50 mass % or more,
   wherein the oxazoline group-containing compound is an oxazoline derivative represented by the following formula (2) or (3)

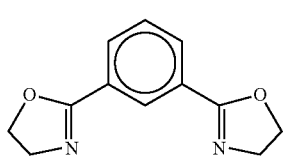
(2)

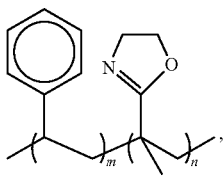

(3)

and
  wherein in the formula (3), m and n each represents an integer, and
  wherein a total stoichiometric amount of the oxazoline group-containing compound and the reaction product thereof is 0.02 mmol or more and 2 mmol or less with respect to 1 g of the carbon black.

17. The resin molded body according to claim 16, wherein saturated water absorption rate of the resin molded body is 0.27% or more and 0.31% or less.

18. An article comprising a resin molded body,
  the resin molded body comprising:
  a polyacetal;
  conductive carbon black which has an organic functional group having acid active hydrogen;
  graphite; and
  an oxazoline group-containing compound and a reaction product thereof,
  wherein a content of the polyacetal is 50 mass % or more,
  wherein the oxazoline group-containing compound is an oxazoline derivative represented by the following formula (2) or (3)

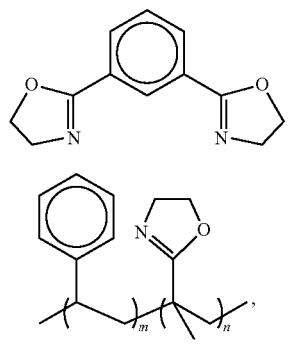

and
  wherein in the formula (3), m and n each represents an integer, and
  wherein a total stoichiometric amount of the oxazoline group-containing compound and the reaction product thereof is 0.02 mmol or more and 2 mmol or less with respect to 1 g of the carbon black.

19. The article according to claim 18, wherein the article is at least one member selected from the group consisting of an electrical contact member, a photosensitive drum flange, a process cartridge part, and a bearing member.

20. The article according to claim 18, wherein the content of the graphite is 2 mass % or more and 8 mass % or less.

* * * * *